United States Patent
Matsumoto et al.

(10) Patent No.: US 6,841,271 B2
(45) Date of Patent: Jan. 11, 2005

(54) FERROMAGNETIC IRON ALLOY POWDER FOR MAGNETIC RECORDING MEDIUM AND METHOD OF PRODUCING THE SAME

(75) Inventors: Kazuyuki Matsumoto, Okayama (JP); Kimitaka Sato, Okayama (JP); Takatoshi Fujino, Honjo (JP); Kenichi Inoue, Okayama (JP)

(73) Assignee: Dowa Mining Co., Ltd., Tokyo (JP)

( * ) Notice: Subject to any disclaimer, the term of this patent is extended or adjusted under 35 U.S.C. 154(b) by 134 days.

(21) Appl. No.: 10/378,861

(22) Filed: Mar. 5, 2003

(65) Prior Publication Data

US 2003/0172996 A1 Sep. 18, 2003

(30) Foreign Application Priority Data

Mar. 7, 2002 (JP) ........................................ 2002-061728

(51) Int. Cl.⁷ .................................................. G11B 5/66
(52) U.S. Cl. .............................. 428/694 MT; 428/403; 428/694 R; 428/900; 428/692; 252/62.55; 148/306; 148/310; 148/311
(58) Field of Search ................................. 148/306–311; 428/403, 694 R, 900, 694 MT, 692; 252/62.55

(56) References Cited

U.S. PATENT DOCUMENTS 5,252,380 A * 10/1993 Nakazumi et al. .......... 428/141
5,645,652 A * 7/1997 Okinaka et al. ............ 148/307
6,638,599 B2 * 10/2003 Masaki et al. .............. 428/141

FOREIGN PATENT DOCUMENTS

JP          4230004          8/1992

* cited by examiner

Primary Examiner—John P. Sheehan
(74) Attorney, Agent, or Firm—Clark & Brody (57) ABSTRACT

A ferromagnetic iron alloy powder for a magnetic recording medium is composed of acicular iron-base particles of an average major axis length (X) of not less than 20 nm and not greater than 80 nm and have oxygen content of not less than 15 wt % and coercive force (Hc) of not less than [$0.0036 X^3 - 1.1 X^2 + 110 X - 1390$ (Oe)] (where X is average major axis length expressed in nm). The ferromagnetic iron alloy powder is obtained by reacting metal powder composed of acicular iron-base particles having an average major axis length of not less than 20 nm and not greater than 80 nm with pure water in substantial absence of oxygen to form a metal oxide film on the particle surfaces. Optionally, the particles can be reacted with a weak oxidizing gas by a wet or dry method.

4 Claims, 3 Drawing Sheets

FERROMAGNETIC IRON ALLOY POWDER FOR MAGNETIC RECORDING MEDIUM AND METHOD OF PRODUCING THE SAME

BACKGROUND OF THE INVENTION

1. Field of the Invention

This invention relates to a ferromagnetic iron alloy powder suitable for constituting the magnetic layer of a magnetic tape, magnetic disk or other magnetic recording medium.

2. Background Art

In recent years, the need has increased for magnetic recording media that offer not only improved recording capacity but also enhanced reliability and durability.

In order to boost recording capacity, an intense effort is underway to shorten the wavelength of the signals used so as to enable next-generation magnetic recording media to achieve still higher recording density. This in turn has created a need for finer ferromagnetic powders with superior properties. Unless the size of the acicular particles is much smaller than the length of the region recording signals on the short-wavelength side, a state of magnetization transition clearly cannot be produced, making recording substantially impossible. Acicular ferromagnetic iron alloy powders are therefore required to have sufficiently small major axis length. To be specific, such powders are desirably composed of very fine particles with a major axis length of not greater than 80 nm. Moreover, a ferromagnetic iron alloy powder used in a high-density-ready magnetic recording medium must have high coercive force Hc in order to maintain magnetization in, and secure an output from, the high-density medium.

Owing to advances in the system technologies, moreover, the conventional inductive head is being replaced by high-sensitivity MR and GMR heads. When a ferromagnetic iron alloy powder having a high saturated magnetization σs intended for use with a conventional head is used with such a head, the high-sensitivity MR or GMR head is saturated. Unlike heretofore, therefore, a low σs powder is required. The powder may, for instance, be required to have a low σs of not higher than 130 emu/g, though the appropriate value differs depending on the system.

In light of these circumstances, ferromagnetic iron alloy powders for magnetic recording media have, from the functional aspect, come to require as concomitant properties: ultra-fine particles not exceeding 80 nm, high coercive force, and low σs of not greater than 130 emu/g.

Improved reliability is needed because the importance of avoiding loss of stored data increases with increasing magnetic recording medium capacity. Tape for storing data requires particularly high reliability and, because of this, improvement of tape storage stability is desirable. In other words, it is essential for the ferromagnetic iron alloy powder itself to have high weather resistance (oxidation resistance) so as to be capable of remaining stable, unaffected by the surrounding environment.

The point is, therefore, that a ferromagnetic iron alloy powder suitable for a high-density magnetic recording medium must simultaneously satisfy the requirements of fine particle size, high Hc, low σs, and good weather resistance (oxidization resistance). At present, however, no ferromagnetic iron alloy powder is available that simultaneously and adequately meets these criteria.

It is extremely difficult to simultaneously achieve high Hc and oxidization resistance in a ferromagnetic iron alloy powder of reduced particle size. In order to impart oxidization resistance, the metal particle surfaces must be covered with a uniform and dense oxide film. Such an oxide film is hard to form on ultra-fine particles. This can be seen, for example, from the fact that a method of oxidizing particle surfaces using a weak oxidizing gas (weak oxidizing gas obtained by mixing water vapor or oxygen gas with an inert gas), such as taught by JP 4-230004A, is effective when applied to ordinary particles of over 100 nm but does not work with ultra-fine particles having a major axis length of 80 nm or less because the shape of the internal metal core portion deforms to lower the coercive force.

An object of the present invention is therefore to overcome the foregoing problems by providing a ferromagnetic iron alloy powder suitable for a high-density magnetic recording medium that simultaneously meets the requirements of fine particle size, high Hc, low σs, and excellent weather resistance (oxidization resistance).

SUMMARY OF THE INVENTION

The inventors carried out various studies and experimentation for achieving this object. Through these efforts the inventors discovered that in the production of an iron-base acicular ferromagnetic iron alloy powder by a method of dewatering and reducing a starting material of acicular iron oxy-hydroxide, the reduced metal powder surfaces become very (and increasingly) active with increasing a decrease of the particle size into the ultra-fine region below a major axis length of 80 nm, so that when the particles are immersed in water they react with the water to generate a small amount of hydrogen. In other words, the oxygen (O) generated by decomposing $H_2O$ by reaction of the fine particulate metal powder with bulk liquid water is consumed to form oxide at the metal surfaces and only the hydrogen (H) is discharged to the exterior as hydrogen gas. The oxide formed on the metal surfaces by this phenomenon is present as a very dense and uniform oxide film and, unlike in the case of conventional formation of oxide film using a weak oxidizing gas, the shape (acicularity) of the internal metal particle experiences substantially no deformation.

The present invention, which was accomplished based on this finding, enables production of a ferromagnetic iron alloy powder with high coercive force because the acicular shape of the internal metal particles is very well retained even in the case of ultra-fine particles of a major axis length of not greater than 80 nm containing a large amount of oxygen, e.g., having an oxygen content of 15 wt % or greater and in some cases even greater than 20 wt % or 25 wt %. (Increasing oxygen content helps to lower (σs.)

Specifically, the present invention in one aspect provides a ferromagnetic iron alloy powder for a magnetic recording medium composed of acicular iron-base particles of an average major axis length (X) of not less than 20 nm and not greater than 80 nm and having oxygen content of not less than 15 wt % and coercive force (Hc) of not less than $[0.0036 X^3 - 1.1 X^2 + 110 X - 1390 (Oe)]$ (where X is average major axis length expressed in nm).

The fact that Hc is not less than $[0.0036 X^3 - 1.1 X^2 110 X - 1390 (Oe)]$ (where X is average major axis length expressed in nm) means that the minimum value of the coercive force (Hc) of the ferromagnetic iron alloy powder when the average major axis length is smaller than 80 nm is expressed as a three dimensions function of X as defined above.

The ferromagnetic iron alloy powder can contain an amount of Co such that Co/Fe expressed in atomic percentage is 10–50 at. %, have saturated magnetization ($\sigma s$) of not greater than 130 emu/g, and have $\Delta \sigma s$ (percent change in $\sigma s$ during one-week storage at a constant temperature and relative humidity of 60° C. and 90%) of not greater than 15%.

As explained above, the ferromagnetic iron alloy powder can be produced by a method of reacting metal powder composed of acicular iron-base particles having an average major axis length of not less than 20 nm and not greater than 80 nm with water in the substantial absence of oxygen to form a metal oxide film on the particle surfaces. In addition, the ferromagnetic iron alloy powder can be produced by a method of reacting metal powder composed of acicular iron-base particles having an average major axis length of not less than 20 nm and not greater than 80 nm with water in the substantial absence of oxygen to form a metal oxide film on the particle surfaces and thereafter growing the metal oxide film by wet or dry reaction with a weak oxidizing gas.

DESCRIPTION OF THE PREFERRED EMBODIMENTS

The present invention was accomplished in response to the aforesaid need to reduce the particle size of ferromagnetic iron alloy powders for a magnetic recording medium. It is therefore directed to acicular particles of an average major axis length of not greater than 80 nm. The average major axis length of the particles is, however, preferably not less than 20 nm because the powder becomes too fine below this level.

Such an acicular ferromagnetic iron alloy powder having an average major axis length of not less than 20 nm and not greater than 80 nm can be produced by heat-dewatering ordinarily produced acicular hydrous iron oxide (iron oxyhydroxide, practically $\alpha$-FeOOH) at a temperature of 200–600° C. and heat-reducing the obtained acicular iron oxide particles in hydrogen gas at 300–700° C. as in the ordinary method. For property enhancement, the ferromagnetic iron alloy powder can, by any of various known conventional methods, have its particles incorporated with additional elements other than iron, such as, but not limited to, Al, Si, Co and rare earth elements (defined as including Y). Otherwise any of these elements can be adhered to the particle surfaces.

In any case, the particles of ferromagnetic iron alloy powder heat-reduced in the final process will experience progressive oxidation if exposed to air without further treatment. Of particular note is that the surface activity of the particles, and thus their tendency to oxidize, increases with increasing fineness of the particles. When the particles oxidize, the ferromagnetic iron alloy powder can no longer perform its function. The reduced ferromagnetic iron alloy powder particles are therefore imparted with stability against oxidation by forming an oxidization resistant film on their surfaces. The oxidization resistant film is formed in the state of an oxide coating by controlled oxidation of the particles, thereby imparting oxidation stability.

Various conventional methods for oxidizing the surfaces of ferromagnetic iron alloy powder particles are known, including one in which the reduced ferromagnetic iron alloy powder is gradually oxidized at the particle surfaces by brining it in contact with a weak oxidizing gas (an inert gas containing an appropriate amount of oxygen or water vapor) at an appropriate temperature and another in which the reduced ferromagnetic iron alloy powder is immersed in toluene or the like and then oxidized by drying in air. In the former, more typical method using a weak oxidizing gas, oxidation control is performed by controlling the temperature and oxygen concentration of the atmosphere. The oxidization resistance of the ferromagnetic iron alloy powder improves with increasing oxidation, i.e., with increasing surface oxide film thickness. However, it was found that when this method is applied to the ultra-fine particles that are the subject of the present invention, the acicularity of the internal metal core portion deforms markedly if the oxidation proceeds to point of establishing oxidization resistance. As a result, the coercive force of the ferromagnetic iron alloy powder, which depends on magnetic shape anisotropy, declines markedly and SFD is also degraded. In other words, the acicularity of the internal metal core portion cannot be retained, presumably because the oxidation reaction occurring at the particle surface locally proceeds unevenly. In the case of ultra-fine particles of an average major axis length of not greater than 80 nm, the average short minor axis length becomes as short as 10 nm. If the surface of such an ultra-fine particle should be oxidized to form an oxide film of, say, 4 nm, the short minor axis length of the internal metal core is reduced to a very short 2 nm, so that even the slightest unevenness in the progress of oxidation will markedly degrade the acicularity of the internal metal core and considerably degrade the magnetic properties. For ultra-fine particles of an average major axis length of not greater than 100 nm, the oxide film thickness required for adequate oxidization resistance is, as expressed using oxygen content as an index of film thickness, at least 15%. It was learned, however, that a high coercive force of, for instance, 2,000 (Oe) is hard to realize using a conventional surface oxidizing method when the oxygen content is 15% or greater.

On the other hand, it was also found that the very high surface activity and susceptibility to oxidization that are a special characteristic of ultra-fine particle in their "as reduced" state is not necessarily the disadvantage it may seem, because this same characteristic can be utilized to form a uniform, dense oxide film. That is, it was discovered that ultra-fine particles of a ferromagnetic iron alloy powder in their reduced condition without further treatment have strong ability to decompose $H_2O$. This ability to break down $H_2O$ can be used to form a uniform and dense oxide film on the ultra-fine particles. When this capability is utilized, the acicularity of the internal metal core can be thoroughly retained and a high coercive force achieved.

In the method of the present invention, as a first step, the reduced ferromagnetic iron alloy powder is reacted with water in an atmosphere of an inert gas such as nitrogen gas.

Then, as a second step, oxidation is conducted by holding the atmosphere of the inert gas such as nitrogen gas at 10–300° C. and adding water and oxygen.

The ferromagnetic iron alloy powder obtained in this manner, even if composed of ultra-fine particles of an average major axis length of 20–80 nm, is formed with a dense and uniform surface oxide film without experiencing degradation of the acicularity of the internal metal core. As a result, a ferromagnetic iron alloy powder can be obtained that has high oxidization resistance and high Hc despite being composed of ultra-fine particles. Although this improvement can be achieved to a substantial degree by subjecting the reduced ferromagnetic iron alloy powder to the first step only, the treatment sequence consisting of the first and second steps makes it possible to densify the oxide film still further to obtain fine particles exhibiting an even higher Hc.

This will be explained further. In the treatment of the first step involving the ferromagnetic iron alloy powder and water (preferably pure water), the desired effect can be obtained at a treatment temperature of 10–90° C., preferably 10–60° C. This step can be conducted by the wet method of adding the ferromagnetic iron alloy powder to the pure water or by the dry method of reacting gaseous pure water (water vapor) and the ferromagnetic iron alloy powder in an inert atmosphere. When the wet method is used, pure water that has been thoroughly removed of oxygen by degassing with nitrogen gas should be used. The mixture of ferromagnetic iron alloy powder and pure water should be appropriately stirred so that uniform reaction is ensured by thorough dispersion of the ferromagnetic iron alloy powder in the water. The end of the reaction can be determined from the detection of the amount of generated hydrogen.

In this reaction, when the ferromagnetic iron alloy powder is mixed with the water, generation of hydrogen begins and oxidation of the metal at the surfaces of the ferromagnetic iron alloy powder particles proceeds with the oxygen decomposed from the water. In the vapor phase reaction that oxidizes the surfaces of the ferromagnetic iron alloy powder particles of the prior art, the heat generated in the course of the reaction further increases the rate of oxidation. The oxidation therefore progresses too far at some localities, while at others it does not. This is thought to be why the internal metal cores of the ferromagnetic iron alloy powder lose their acicularity. In the wet reaction with pure water according to this invention, since the ferromagnetic iron alloy powder reacts with excessive water, the heat generated by the oxidation can escape into a large volume of water. This can be considered to suppresses local heat generation and, by extension, keep the oxidation rate from becoming too high. It is believed that this is what enables the core metal portions inside the particles to retain their high acicularity.

Particular attention has to be given to preventing surface oxidation of the reduced ferromagnetic iron alloy powder before it is subjected to the reaction with water in accordance with the present invention. This is because if oxygen-induced surface oxidation progresses before conducting the reaction with water of this invention, any attempt to produce a dense oxide film by reaction with water thereafter will fail and the acicularity of the cores will be lost. In other words, the effect of the invention cannot be obtained when, for example, the reduced ferromagnetic iron alloy powder is treated with a mixed gas of oxygen and water vapor before oxidation in water.

When the first step is conducted by the wet method, the product upon completion of the reaction by the wet method is filtered (or centrifuged) in an inert gas such as nitrogen gas and then washed with water. Drying is then conducted at a temperature of not higher than 60° C., preferably not higher than 40° C. The drying is continued until all adsorbed water has been removed. A drying time of about 6 hours suffices.

In the following second step, the dry ferromagnetic iron alloy powder obtained in the first step is maintained at a temperature of 10–300° C. while, under an atmosphere of an inert gas such as nitrogen gas, introducing water and oxygen to conduct surface oxidation. The treatment of the second step can also be conducted by either the wet method or the dry method. In the wet method, oxidation of the particle surfaces is suitably conducted by adding the aforesaid ferromagnetic iron alloy powder to pure water held at 10–100° C. and leading a gas containing 0.01–21 vol. % of oxygen into the mixture. In the dry method, the particle surfaces are oxidized in an atmosphere obtained by adding 10 vol. % of water vapor to an inert atmosphere of a nitrogen gas atmosphere and then in an atmosphere obtained by further adding 0.01–21 vol % of oxygen gas to the foregoing atmosphere. The oxidization progresses farther with increasing holding temperature. The holding temperature is therefore set to a value appropriate for the desired oxidization resistance and desired us. From the viewpoint of ensuring the acicularity of the metal cores inside the particles, the wet method should conducted at a temperature of 10–90° C. and the dry method at a temperature of 60–200° C. The amount of water vapor added in the case of vapor phase treatment is preferably not less than 10 vol. % because uneven oxidation is liable to occur below this level. The oxygen concentration relative to the inert gas is set in the range of 0.01–21 vol. % but should be gradually increased starting from 0.01 vol. %. The order of changing the atmosphere is to start with a nitrogen atmosphere, change this to a mixed atmosphere of nitrogen and water vapor, and then, after passage of 10 or more minutes, changing the mixed atmosphere to a mixed atmosphere of nitrogen, water vapor and oxygen. The desired effect cannot be obtained if this order is changed. The wet and dry methods can be combined in the second step. Specifically, the densification of the oxide film can be still further promoted by stopping the oxidation treatment by the wet process in the second step before reaching the desired oxidation end point and then switching to oxidization treatment by the dry method to conduct oxidation up to the oxidation end point.

Although the object of this invention can be achieved by the treatment of the first step alone without conducting the second step, a considerably long reaction period is necessary in this case. In the first step explained in the foregoing, for example, the treatment of reacting the reduced ferromagnetic iron alloy with water at a temperature of 10–90 ° C. should be continued over a period of 7 days or longer. This exceedingly slow reaction can be speeded up to some degree by setting the treatment temperature on the high side. For instance, the treatment time can be shortened by setting the temperature at 10–60° C. for about 2 hours at the start of the reaction and conducting the remainder of the treatment at a temperature of 80–90° C. The ferromagnetic iron alloy powder obtained by only the first step has a dense oxide film and retains the acicularity of the internal metal cores. It therefore has high coercive force.

As set out in the foregoing, this invention provides a ferromagnetic iron alloy powder whose average major axis length is not less than 20 nm and not greater than 80 nm, preferably not less than 20 nm and not greater than 60 nm, more preferably not less than 20 nm and not greater than 50 nm, that exhibits in relation to the average major axis length (X) coercive force Hc of not less than [0.0036 $X^3$−1.1 $X^2$+110 X−1390 (Oe)], preferably not less than [0.0036 $X^3$−1.1 $X^2$+110 X−1290 (Oe)], and whose oxygen content is not less than 15 wt %, preferably not less than 20 wt %, and more preferably not less than 25 wt %.

This ferromagnetic iron alloy powder can contain an amount of Co such that Co/Fe expressed in atomic percentage is 10–50 at. %, have saturated magnetization (σs) of not greater than 130 emu/g, preferably not greater than 110 emu/g, more preferably not more than 90 emu/g, and have Δσs (percent change in σs during one-week storage at a constant temperature and relative humidity of 60° C. and 90%) of not greater than 15%. In addition, as elements other than iron this ferromagnetic iron alloy powder can contain Al of not more than 30 at. % and a rare earth element (including Y) of not greater than 30 at. %.

EXAMPLES

Example 1

Iron oxy-hydroxide used as the starting material was dewatered, baked and heat-reduced in a hydrogen atmosphere to obtain a ferromagnetic iron alloy powder of an average major axis length of 80 nm, a Co content in terms of Co/Fe expressed in atomic percentage of 20 at. %, an Al content in terms of Al/(Fe+Co) expressed in atomic percentage of 10 at. % and Y (yttrium) content in terms of Y/(Fe+Co) expressed in atomic percentage of 8 at. %. This ferromagnetic iron alloy powder (as reduced) was used as the specimen subjected to the following treatment.

First step: 500 ml of pure water was placed in a sealable 1-liter beaker and nitrogen gas was blown into the pure water to purge oxygen from the beaker and dissolved oxygen from the liquid. The temperature of the pure water was maintained at 30° C. during purging. Next, while maintaining the same temperature, 10 g of the heat-reduced ferromagnetic iron alloy powder prepared beforehand was cast into the pure water in the beaker in a state sealed off from the atmosphere and the result was maintained in that state for 120 minutes under stirring. During the stirring, a slight amount of nitrogen gas was introduced into the beaker to inhibit invasion of external oxygen. Owing to this treatment, the ferromagnetic iron alloy powder reacted with the water to generate a small amount of hydrogen.

This 120-minute treatment in pure water was followed by filtering and washing with water in a nitrogen gas atmosphere to obtain a wet ferromagnetic iron alloy powder. The obtained wet powder was dried at 60° C. in a nitrogen gas atmosphere until no more water vapor was generated.

Second step: The ferromagnetic iron alloy powder from the first step was heated to (and to the completion of this step maintained at) 120° C. in a tube furnace into which nitrogen gas was introduced at the rate of 20 liter/min. Once the temperature had stabilized, water vapor was added to the atmosphere. The water vapor was introduced at the rate of 10 vol. % relative to the nitrogen. Next, oxygen gas was added to the nitrogen/water vapor atmosphere. Oxygen initially was added at the rate of 0.01 vol % relative to the nitrogen. The oxygen concentration was thereafter gradually brought up to a final value of 10 vol. % over 12 hours.

The bulk properties of the obtained ferromagnetic iron alloy powder and the magnetic properties of a tape fabricated using the powder were evaluated as set out below. The results of the evaluations are shown in Table 1.

Particle size: The major axis lengths of 100 or more particles measured using a TEM micrograph of 150 thousand or more magnifications were averaged.

Oxygen content: Measured with a nitrogen/oxygen determinator (product of LECO Corporation).

Magnetic properties: Measured at 10 kOe with a VSM.

Oxidization resistance: Evaluated by calculating percent (%) change in saturated magnetization over one one-week storage at 60° C., 90% RH in a thermo-hygrostat.

A magnetic tape for evaluation was fabricated by blending with 100 parts by weight of the ferromagnetic iron alloy powder each of the materials set out below in the indicated number of parts by weight, homogenizing the mixture in a centrifugal ball mill for 1 hour to obtain a magnetic paint and applying the magnetic paint on a base film composed of polyethylene terephthalate using an applicator. The evaluation was done by measuring the coercive force Hcx of the magnetic tape and calculating the SFD value from the hysteresis loop.

| | |
|---|---|
| Ferromagnetic iron alloy powder | 100 parts by weight |
| Polyurethane resin | 30 parts by weight |
| Methyl ethyl ketone | 190 parts by weight |
| Cyclohexanone | 80 parts by weight |
| Toluene | 110 parts by weight |
| Stearic acid | 1 part by weight |
| Acetylacetone | 1 part by weight |
| Alumina | 3 parts by weight |
| Carbon black | 2 parts by weight |

Examples 2–3

Example 1 was repeated except that the treatment temperature in the second step was set at 170° C. (Example 2) and 200° C. (Example 3). The obtained ferromagnetic iron alloy powders were evaluated as described in Example 1. The results are shown in Table 1.

Examples 4–10

Example 1 was repeated except that iron oxy-hydroxide starting materials of different particle sizes were used to vary the average major axis length of the ferromagnetic iron alloy powder as set out below and that the treatment temperature (oxidation temperature) in the second step was changed to the temperatures shown below. The obtained ferromagnetic iron alloy powders were evaluated as described in Example 1. The results are shown in Table 1.

| | Ave. major axis length (nm) | 2nd step treatment temp. (° C.) |
|---|---|---|
| Example 4 | 60 | 120 |
| Example 5 | 60 | 170 |
| Example 6 | 60 | 200 |
| Example 7 | 40 | 120 |
| Example 8 | 40 | 170 |
| Example 9 | 40 | 200 |
| Example 10 | 20 | 120 |

Comparative Examples 1–10

Example 1 was repeated except that the first step was omitted and the second step conditions were altered as shown below. The particle sizes of the ferromagnetic iron alloy powders in the Comparative Examples were those indicated below. In the second step, the ferromagnetic iron alloy powder obtained by reduction was heated to the treatment temperature (oxidation temperature) shown below for the Comparative Example concerned while introducing nitrogen at the rate of 20 liter/min. Once the temperature had stabilized, oxygen was introduced. Oxygen initially was added at the rate of 0.01 vol % relative to the nitrogen. The oxygen concentration was thereafter gradually brought up to a final value of 10 vol. % over 12 hours. The obtained ferromagnetic iron alloy powders were evaluated as described in Example 1. The results are shown in Table 1.

|  | Particle size (nm) | Treatment temp. (° C.) |
|---|---|---|
| Comparative Example 1 | 80 | 120 |
| Comparative Example 2 | 80 | 170 |
| Comparative Example 3 | 80 | 200 |
| Comparative Example 4 | 60 | 120 |
| Comparative Example 5 | 60 | 170 |
| Comparative Example 6 | 60 | 200 |
| Comparative Example 7 | 40 | 120 |
| Comparative Example 8 | 40 | 170 |
| Comparative Example 9 | 40 | 200 |
| Comparative Example 10 | 20 | 120 |

Comparative Example 11

The same reduced ferromagnetic iron alloy powder as used in Examle 4 was surface oxidized under the same conditions as set forth in Example 1 of JP 4–230004A. The obtained ferromagnetic iron alloy powder was evaluated as described in Example 1. The results are shown in Table 1.

TABLE 1

|  | No | First step | | | Second step | | | | | Overall |
|---|---|---|---|---|---|---|---|---|---|---|
|  |  | Liquid phase | Temp °C. | Treatment time Min | Liquid phase/vapor phase | Oxgen conentration increase | Oxidation temp. °C. | Water vapor concentration during vapor-phase oxidation % | Time Min | Oxidant addition order |
| Exmp | 1 | Liquid | 30 | 120 | Vapor | Gradually | 120 | 10 | 720 | H2O → H2O + O2 |
| Exmp | 2 | Liquid | 30 | 120 | Vapor | Gradually | 170 | 10 | 720 | H2O → H2O + O2 |
| Exmp | 3 | Liquid | 30 | 120 | Vapor | Gradually | 200 | 10 | 720 | H2O → H2O + O2 |
| Exmp | 4 | Liquid | 30 | 120 | Vapor | Gradually | 120 | 10 | 720 | H2O → H2O + O2 |
| Exmp | 5 | Liquid | 30 | 120 | Vapor | Gradually | 170 | 10 | 720 | H2O → H2O + O2 |
| Exmp | 6 | Liquid | 30 | 120 | Vapor | Gradually | 200 | 10 | 720 | H2O → H2O + O2 |
| Exmp | 7 | Liquid | 30 | 120 | Vapor | Gradually | 120 | 10 | 720 | H2O → H2O + O2 |
| Exmp | 8 | Liquid | 30 | 120 | Vapor | Gradually | 170 | 10 | 720 | H2O → H2O + O2 |
| Exmp | 9 | Liquid | 30 | 120 | Vapor | Gradually | 200 | 10 | 720 | H2O → H2O + O2 |
| Exmp | 10 | Liquid | 30 | 120 | Vapor | Gradually | 120 | 10 | 720 | H2O → H2O + O2 |
| Comp | 1 | — | — | — | Vapor | Gradually | 120 | — | 720 | O2 |
| Comp | 2 | — | — | — | Vapor | Gradually | 170 | — | 720 | O2 |
| Comp | 3 | — | — | — | Vapor | Gradually | 200 | — | 720 | O2 |
| Comp | 4 | — | — | — | Vapor | Gradually | 120 | — | 720 | O2 |
| Comp | 5 | — | — | — | Vapor | Gradually | 170 | — | 720 | O2 |
| Comp | 6 | — | — | — | Vapor | Gradually | 200 | — | 720 | O2 |
| Comp | 7 | — | — | — | Vapor | Gradually | 120 | — | 720 | O2 |
| Comp | 8 | — | — | — | Vapor | Gradually | 170 | — | 720 | O2 |
| Comp | 9 | — | — | — | Vapor | Gradually | 200 | — | 720 | O2 |
| Comp | 10 | — | — | — | Vapor | Gradually | 120 | — | 720 | O2 |
| Comp | 11 | Condition of JP4-230004A | | | | | | | | H2O + O2 added simultaneously |

|  | No | Bulk properties | | | | | | | | Tape properties | |
|---|---|---|---|---|---|---|---|---|---|---|---|
|  |  | Particle size mm | Co/Fe at. % | Al/(Fe + Co) at. % | Y/(Fe + Co) at. % | Oxygen content wt % | σs emu/g | Δσs % | Hc Oe | Hcx Oe | SFD |
| Exmp | 1 | 80 | 20 | 10 | 8 | 17 | 124 | 2.9 | 2483 | 2680 | 0.24 |
| Exmp | 2 | 80 | 20 | 10 | 8 | 24 | 104 | 1.1 | 2460 | 2730 | 0.28 |
| Exmp | 3 | 80 | 20 | 10 | 8 | 30 | 88 | 0.2 | 2422 | 2680 | 0.31 |
| Exam | 4 | 60 | 20 | 10 | 8 | 18 | 105 | 6.0 | 2414 | 2570 | 0.36 |
| Exmp | 5 | 60 | 20 | 10 | 8 | 25 | 83 | 2.0 | 2362 | 2570 | 0.46 |
| Exmp | 6 | 60 | 20 | 10 | 8 | 31 | 65 | 0.4 | 2280 | 2490 | 0.57 |
| Exmp | 7 | 40 | 20 | 10 | 8 | 20 | 88 | 11.0 | 2259 | 2480 | 0.54 |
| Exmp | 8 | 40 | 20 | 10 | 8 | 26 | 68 | 5.7 | 2235 | 2440 | 0.65 |
| Exmp | 9 | 40 | 20 | 10 | 8 | 33 | 47 | 3.3 | 2129 | 2350 | 0.89 |
| Exmp | 10 | 20 | 20 | 10 | 8 | 24 | 63 | 11.2 | 1607 | 1600 | 1.10 |
| Comp | 1 | 80 | 20 | 10 | 8 | 18 | 114 | 4.2 | 2140 | 2290 | 0.38 |
| Comp | 2 | 80 | 20 | 10 | 8 | 25 | 94 | 1.6 | 2000 | 2120 | 0.50 |
| Comp | 3 | 80 | 20 | 10 | 8 | 32 | 77 | 0.1 | 1823 | 1930 | 0.74 |
| Comp | 4 | 60 | 20 | 10 | 8 | 20 | 92 | 6.9 | 1920 | 2010 | 0.75 |
| Comp | 5 | 60 | 20 | 10 | 8 | 26 | 71 | 2.4 | 1618 | 1770 | 0.95 |
| Comp | 6 | 60 | 20 | 10 | 8 | 33 | 52 | 0.3 | 1279 | 1410 | 1.28 |
| Comp | 7 | 40 | 20 | 10 | 8 | 22 | 75 | 12.0 | 1340 | 1580 | 1.00 |
| Comp | 8 | 40 | 20 | 10 | 8 | 27 | 56 | 7.4 | 1132 | 1300 | 1.30 |
| Comp | 9 | 40 | 20 | 10 | 8 | 34 | 33 | 4.2 | 695 | 880 | 1.88 |

TABLE 1-continued

| Comp | 10 | 20 | 20 | 10 | 8 | 25 | 52 | 11.2 | 218 | 350 | 1.72 |
| Comp | 11 | 60 | 20 | 10 | 8 | 19 | 98 | 7 | 1920 | 2120 | 0.67 |

The following conclusions can be drawn from Table 1.
(1) When, as in the Comparative Examples, the surface oxidation was allowed to proceed in the vapor phase and the oxidation temperature was raised to increase the oxygen content, the $\Delta\sigma s$, an index of oxidization resistance, improved progressively, but Hc and other magnetic property declined markedly. This phenomenon was more pronounced with increasing particle fineness. The degradation of magnetic properties with increasing oxygen content was therefore particularly manifest in the case of fine particles. Further, even in Comparative Example 11, which used water vapor, since the water vapor included mixed-in oxygen, this high reactivity oxygen was preferentially used for oxidation and no effect was obtained by reaction between the water vapor and the ferromagnetic iron alloy powder. The value of Hc was therefore low.
(2) In contrast, in the Examples according to the present invention, almost no decrease in He occurred even though the oxidization resistance $\Delta\sigma s$ was enhanced by promoting surface oxidation. This action/effect operated strongly in the case of fine particles.

Examples 11 and 12

In Examples 11 and 12, the first step liquid-phase treatment conducted in Examples 4 and 5 was changed to vapor-phase treatment using water vapor and nitrogen gas. The treatment in the ensuing second step was conducted similarly to that in Examples 4 and 5.

In both Examples, the first step vapor-phase treatment was carried out in a mixed gas atmosphere of nitrogen and water vapor, with the water vapor concentration adjusted to 10 vol. %. The treatment was conducted at 120° C. for 30 minutes in Example 11 and at 170° C. for 30 minutes in Example 12. Next, a second step like that of Examples 4 and 5 was conducted and the obtained ferromagnetic iron alloy powder was evaluated as described in Example 1. The results are shown in Table 2. It can be seen from the results shown in Table 2 that the He improvement effect in Examples 11 and 12 was lower than that in Examples 4 and 5 but that the improvement exceeded that in Comparative Examples 4 and 5.

Examples 13 and 14

In Example 13, the second step oxidation treatment of Example 4 was changed to the wet method in liquid phase. Specifically, the treatment of the first step of Example 4 was conducted, the obtained ferromagnetic iron alloy powder was left dispersed in the pure water, and the second step was changed to one of oxidation by introduction of oxygen into this slurry. In the second step liquid-phase oxidation, the slurry temperature was held at 30° C. and the oxygen concentration was increased stepwise from 0.01 vol. % to a final value of 21 vol. % over 24 hours. This oxidation treatment was followed by filtering and water-washing to obtain a wet ferromagnetic iron alloy powder. The wet powder was dried at 60° C. in a nitrogen gas atmosphere until no more water vapor was generated.

Example 14 was conducted in the same manner as Example 13 except that the slurry temperature was 60° C. in both the first and second steps.

The ferromagnetic iron alloy powders obtained in these Examples were evaluated as described in Example 1. The results are shown in Table 2. It will be noted that the Hc of the products of these Examples were higher than that of Example 4 and achieved a still greater improvement over those of Comparative Examples 4 and 5. This is considered to be the result of formation of a dense and uniform surface oxide film owing to the supply of oxygen in a liquid.

Examples 15 and 16

In Examples 15 and 16, the second step oxidation treatment of Example 4 was conducted in liquid phase and vapor phase. Specifically, the second step was started in the manner of the second step of Example 13 (oxidation by introducing oxygen into the slurry) but the oxidation reaction was stopped midway, whereafter filtering, water-washing and drying were conducted, and then oxidation in vapor phase was carried out in the manner of the second step of Example 4. In Example 15, the slurry temperature was held at 30° C. during the liquid-phase oxidation and the oxygen concentration was increased stepwise from 0.01 vol. % to a final value of 21 vol. % over 12 hours. The vapor-phase oxidation was conducted at 120° C. under the same conditions as in the second step of Example 4. Example 16 was carried out in the same manner as Example 15, except that the vapor-phase oxidation treatment temperature was changed to 170° C.

The ferromagnetic iron alloy powders obtained in these Examples were evaluated as described in Example 1. The results are shown in Table 2. It will be noted that the products of these Examples were still more improved, particularly in their high Hc, which exceeded those of Examples 4, 5, 13 and 14, and their excellent oxidization resistance. It is believed that these improvements were realized because the final oxidation treatment conducted at high temperature in vapor phase produced a still more dense surface oxide film and improved the acicularity of the internal metal core.

Examples 17 and 18

Example 17 was carried out in the same manner as Example 4 except that the first step treatment temperature was 80° C. Example 18 was conducted in the same manner as Example 4 except that first step treatment period was 30 minutes.

The ferromagnetic iron alloy powders obtained in these Examples were evaluated as described in Example 1. The results are shown in Table 2. It can be seen that when the first step treatment temperature was high, the magnetic properties tended to be degraded because uniform surface oxidation was hindered, and when the treatment time was too short, the magnetic properties tended to be degraded because the treatment was incomplete. The first step treatment should therefore be conducted at a low temperature over a long time period, i.e., the reaction should be allowed to proceed slowly.

Examples 19 and 20

Example 19 was carried out in the manner of Example 4 except that the concentration of water vapor added in the second step was 3%. Example 20 was carried out in the manner of Example 4 except that the oxygen concentration in the second step was kept at a constant 1 vol. %.

The ferromagnetic iron alloy powders obtained in these Examples were evaluated as described in Example 1. The results are shown in Table 2. It will be noted from a comparison with Example 4 that when the water vapor concentration was too low in the second step, the uniformity of the surface oxidation deteriorated to cause magnetic property degradation. It can also be seen that the oxygen concentration in the second step should preferably be raised stepwise, not held constant.

Example 21

In Example 21, the wet first step treatment Example 4 was carried out for an extended period, with the temperature also extended, and the treatment was terminated at the end of the first step only, without conducting a second step. Specifically, in the first step of Example 4, after the initial reaction with water at 30° C. had been continued for 2 hours, the temperature was raised to 90° C. and the slurry was retained at this temperature for 7 days. This treatment was followed by filtering and water-washing. The obtained wet powder was dried at 60° C. in a nitrogen gas atmosphere until no more water vapor was generated. The ferromagnetic iron alloy powder obtained was evaluated as described in Example 1. The results are shown in Table 2. Owing to the gradual progression of the oxidation reaction using water in this Example, the product exhibited a higher Hc than those of Comparative Examples 4 and 5.

Comparative Example 12

The reduced ferromagnetic iron alloy powder was not subjected to the first step of Example 11 but was directly oxidized by a mixed gas of oxygen and water vapor under conditions corresponding to those of the second step of Example 11 (shown in Table 2). The obtained powder was evaluated as described in Example 1. The results are shown in Table 2.

Comparative Example 13

Comparative Example 12 was repeated except that the reduced ferromagnetic iron alloy powder was, as shown in Table 2, first oxidized with oxygen gas and thereafter oxidized with a mixed gas of oxygen and water vapor obtained by adding water vapor. The obtained powder was evaluated as described in Example 1. The results are shown in Table 2.

The products of Comparative Examples 12 and 13 were lower in Hc than that of Example 4 despite having the same oxygen content (same degree of oxidation). In other words, it can be concluded that a ferromagnetic iron alloy powder with high coercive force can better be obtained not by, as in Comparative Examples 12 and 13, oxidizing the reduced ferromagnetic iron alloy powder, whose particle surfaces are in a very active state, with a highly reactive oxidant such as oxygen but by, as in Example 11, oxidizing the surfaces using low reactivity water vapor, because this forms a dense and uniform surface oxide film and therefore retains the acicularity of the internal metal cores.

TABLE 2

| | No | First step Liquid phase/ vapor phase | First step Temp °C. | First step Treatment time Min | Second step Liquid phase/ vapor phase | Second step Oxgen conentration increase | Second step Oxidation temp. °C. | Second step Water vapor concentration during vapor-phase oxidation % | Second step Time Min | Overall Oxidant addition order |
|---|---|---|---|---|---|---|---|---|---|---|
| Exmp | 11 | Vapor | 120 | 30 | Vapor | Gradually | 120 | 10 | 720 | H2O → H2O + O2 |
| Exmp | 12 | Vapor | 170 | 30 | Vapor | Gradually | 170 | 10 | 720 | H2O → H2O + O2 |
| Exmp | 13 | Liquid | 30 | 120 | Liquid | Gradually | 30 | — | 1440 | H2O → H2O + O2 |
| Exmp | 14 | Liquid | 60 | 120 | Liquid | Gradually | 60 | — | 1440 | H2O → H2O + O2 |
| Exmp | 15 | Liquid | 30 | 120 | Liquid ↓ Vapor | Gradually | Liquid 30 ↓ Vapor 120 | 10 | Liquid 720 ↓ Vapor 720 | H2O → H2O + O2 |
| Exmp | 16 | Liquid | 30 | 120 | Liquid ↓ Vapor | Gradually | Liquid 30 ↓ Vapor 170 | 10 | Liquid 720 ↓ Vapor 720 | H2O → H2O + O2 |
| Exmp | 17 | Liquid | 80 | 120 | Vapor | Gradually | 120 | 10 | 720 | H2O → H2O + O2 |
| Exmp | 18 | Liquid | 30 | 30 | Vapor | Gradually | 120 | 10 | 720 | H2O → H2O + O2 |
| Exmp | 19 | Liquid | 30 | 120 | Vapor | Gradually | 120 | 3 | 720 | H2O → H2O + O2 |
| Exmp | 20 | Liquid | 30 | 120 | Vapor | Constant concentration | 120 | 10 | 720 | H2O → H2O + O2 |
| Exmp | 21 | Liquid | 30 ↓ 90 | 120 min ↓ 7 day | — | — | — | — | — | H2O |
| Comp | 12 | — | — | — | Vapor | Gradually | 120 | 10 | 720 | H2O + O2 added simultaneously |
| Comp | 13 | — | — | — | Vapor | Gradually | 120 | 10 | 720 | O2 → H2O + O2 |

| | No | Bulk properties Particle size mm | Bulk properties Co/Fe at. % | Bulk properties Al/(Fe + Co) at. % | Bulk properties Y/(Fe + Co) at. % | Bulk properties Oxygen content wt % | Bulk properties σs emu/g | Bulk properties Δσs % | Bulk properties Hc Oe | Tape properties Hcx Oe | Tape properties SFD |
|---|---|---|---|---|---|---|---|---|---|---|---|
| Exmp | 11 | 60 | 20 | 10 | 8 | 19 | 100 | 6.5 | 2230 | 2465 | 0.50 |
| Exmp | 12 | 60 | 20 | 10 | 8 | 26 | 77 | 2.2 | 2205 | 2405 | 0.76 |
| Exmp | 13 | 60 | 20 | 10 | 8 | 15 | 126 | 13.0 | 2465 | 2640 | 0.33 |
| Exmp | 14 | 60 | 20 | 10 | 8 | 17 | 118 | 10.0 | 2410 | 2610 | 0.40 |

TABLE 2-continued

| | | | | | | | | | | | |
|---|---|---|---|---|---|---|---|---|---|---|---|
| Exmp | 15 | 60 | 20 | 10 | 8 | 17 | 112 | 5.6 | 2580 | 2703 | 0.27 |
| Exmp | 16 | 60 | 20 | 10 | 8 | 24 | 91 | 1.6 | 2540 | 2680 | 0.37 |
| Exmp | 17 | 60 | 20 | 10 | 8 | 19 | 101 | 7.0 | 2310 | 2505 | 0.51 |
| Exmp | 18 | 60 | 20 | 10 | 8 | 18 | 103 | 9.0 | 2320 | 2510 | 0.52 |
| Exmp | 19 | 60 | 20 | 10 | 8 | 18 | 102 | 7.0 | 2345 | 2540 | 0.54 |
| Exmp | 20 | 60 | 20 | 10 | 8 | 20 | 94 | 8.0 | 2170 | 2395 | 0.57 |
| Exmp | 21 | 60 | 20 | 10 | 8 | 16 | 125 | 12.6 | 2430 | 2630 | 0.35 |
| Comp | 12 | 60 | 20 | 10 | 8 | 20 | 96 | 7.0 | 1980 | 2080 | 0.71 |
| Comp | 13 | 60 | 20 | 10 | 8 | 21 | 94 | 62 | 1930 | 2020 | 0.73 |

Figure 1:
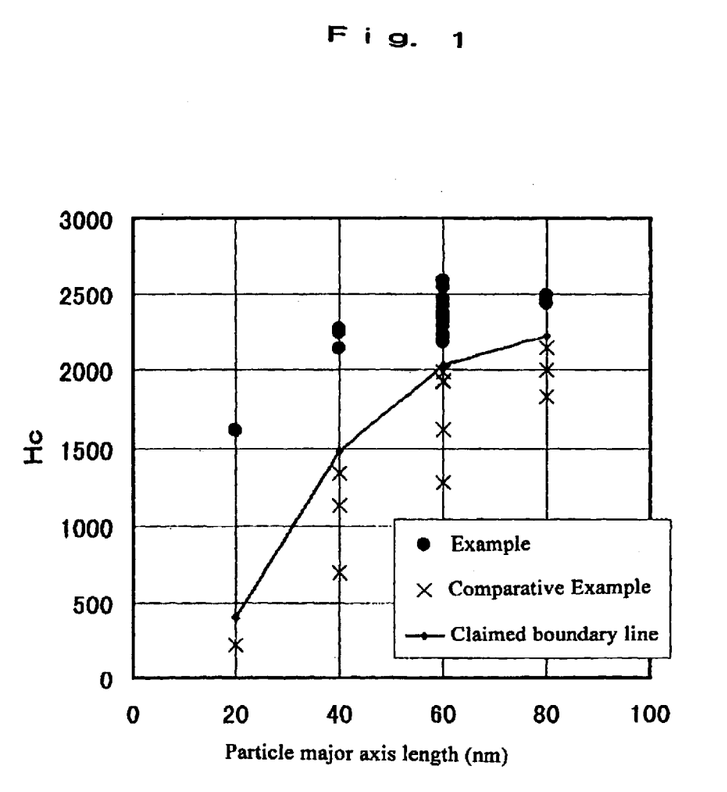
FIG. 1 is a graph showing the relationship between average major axis length and coercive force in the case of ferromagnetic iron alloy powders according to the invention and the same relationship in the case of comparative ferromagnetic iron alloy powders.

FIG. 1 sums up the relationship between average major axis length and coercive force for the ferromagnetic iron alloy powders of the foregoing Examples and Comparative Examples. It will be noted from FIG. 1 that in the ultra-fine particle region of not greater than 80 nm, the ferromagnetic iron alloy powders according to the Examples had higher coercive force than those of the Comparative Examples. The curve in FIG. 1 corresponds to the equation $$Hc = 0.0036\ X^3 - 1.1\ X^2 + 110\ X - 1390\ (Oe).$$

Figure 2:
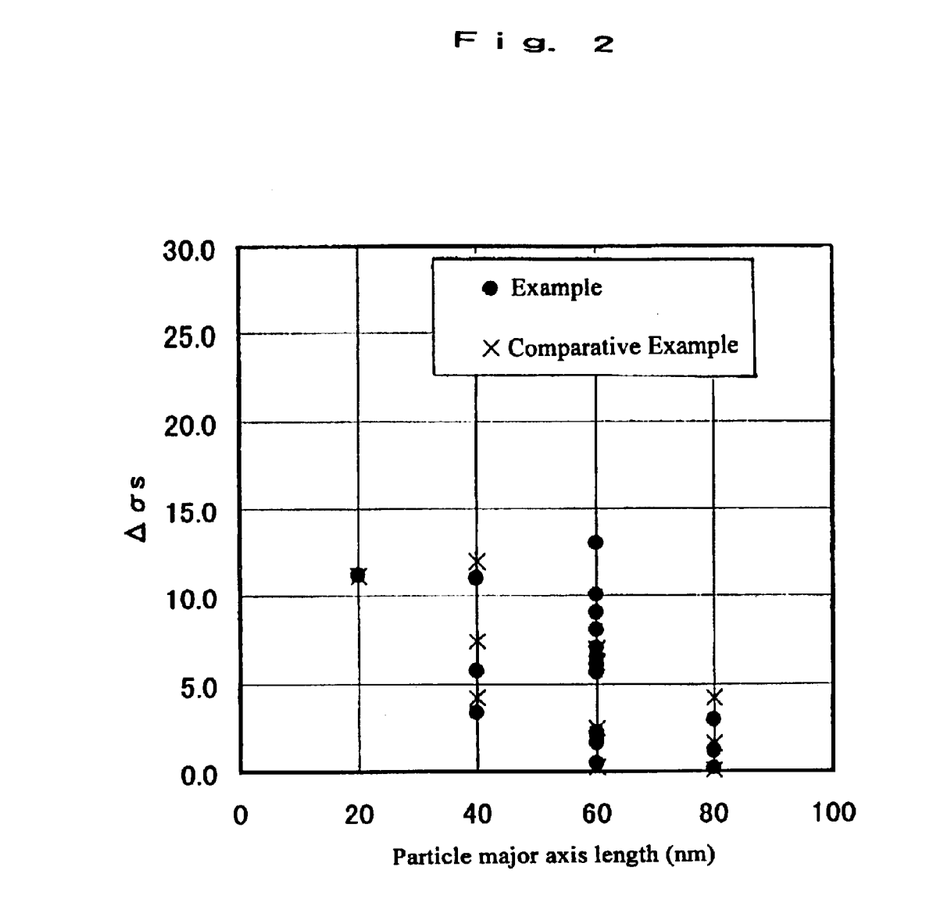
FIG. 2 is a graph showing the relationship between average major axis length and $\Delta \sigma s$ (index of oxidization resistance) in the case of ferromagnetic iron alloy powders according to the invention and the same relationship in the case of comparative ferromagnetic iron alloy powders.

FIG. 2 sums up the relationship between average major axis length and $\Delta\sigma s$ for the ferromagnetic iron alloy powders of the foregoing Examples and Comparative Examples. It will be noted from FIG. 2 that in the ultra-fine particle region of not greater than 80 nm, the ferromagnetic iron alloy powders according to the invention Examples retained $\Delta\sigma s$ on a par with those of the Comparative Examples, i.e. their oxidization resistance was about the same as that of the thick oxide film products of the Comparative Examples.

Figure 3:
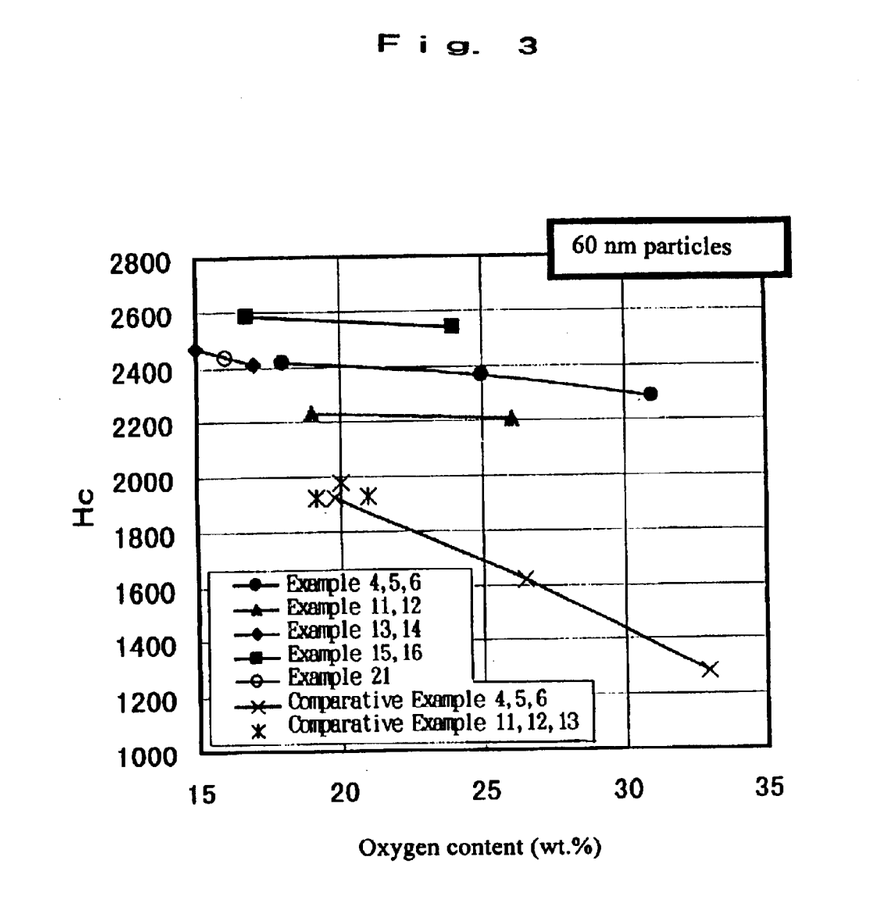
FIG. 3 is a graph showing the relationship between oxygen content and Hc in the case of invention ferromagnetic iron alloy powders of an average major axis length of 60 nm and the same relationship in the case of comparative ferromagnetic iron alloy powders of the same average major axis length.

FIG. 3 sums up the relationship between oxygen content and Hc for the ferromagnetic iron alloy powders of the foregoing Examples and Comparative Examples whose particles had an average major axis length of 60 nm. It will be noted from FIG. 3 that at the same amount of oxygen the ferromagnetic iron alloy powders according to the invention Examples exhibited higher Hc than those of the Comparative Example. This is believed to be because at the same oxygen amount the products of the Examples had a denser and more uniform oxide coating than those of the Comparative Examples and therefore better maintained the acicularity of the core metal.

Example 22

The ferromagnetic iron alloy powder obtained in Example 4 was used to fabricate a magnetic test tape having a double-layer structure composed of a magnetic layer and a nonmagnetic layer. Electromagnetic conversion measurement and storage stability evaluation were carried out. In preparing the magnetic paint, 100 parts by weight of the ferromagnetic iron alloy powder were blended with the materials set out below in the indicated number of parts by weight. In preparing the nonmagnetic powder, 85 parts by weight of nonmagnetic powder were blended with the materials set out below in the indicated number of parts by weight. Both blends were kneaded and dispersed using a kneader and a sand grinder. The obtained paint for magnetic layer formation and paint for nonmagnetic layer (underlayer) formation were applied onto a base film composed of an aramid support to obtain an underlayer thickness of 2.0 μm and a magnetic layer thickness of 0.20 μm. the magnetic layer was oriented while still damp by exposure to a magnetic field, whereafter drying and calendering were conducted to obtain a double-layer structure magnetic tape

| Magnetic paint composition | |
|---|---|
| Ferromagnetic iron alloy powder | 100 parts by weight |
| Carbon black | 5 parts by weight |
| Alumina | 3 parts by weight |
| Vinyl chloride resin (MR110) | 15 parts by weight |
| Urethane resin (UR8200) | 15 parts by weight |
| Stearic acid | 1 part by weight |
| Acetylacetone | 1 part by weight |
| Methyl ethyl ketone | 190 parts by weight |
| Cyclohexanone | 80 parts by weight |
| Toluene | 110 parts by weight |
| Nonmagnetic paint composition | |
| Nonmagnetic powder (α-Fe2O3) | 85 parts by weight |
| Carbon black | 20 parts by weight |
| Alumina | 3 parts by weight |
| Vinyl chloride resin (MR110) | 15 parts by weight |
| Urethane resin (UR8200) | 15 parts by weight |
| Methyl ethyl ketone | 190 parts by weight |
| Cyclohexanone | 80 parts by weight |
| Toluene | 110 parts by weight |

The magnetic properties, i.e., the electromagnetic conversion properties (C/N, output) of the tape were measured. In C/N ratio measurement, a drum tester was attached to the recording head and a digital signal was recorded at a recording wavelength of 0.35 μm. At this time, an MR head was used to measure the reproduced signal and noise was measured as demodulation noise. In evaluation, the output and C/N in the case of using the ferromagnetic iron alloy powder of Comparative Example 14 was defined as 0 dB. The storage stability of the magnetic tape was evaluated as ΔBm, which was defined as the amount of change, expressed in %, in the saturated magnetization between before and after storage for one week in a 60° C., 90% RH atmosphere. The results of the evaluations are shown in Table 3.

Examples 23 and 24

Example 22 was repeated except that the ferromagnetic iron alloy powders obtained in Examples 7 and 15 were used. The results obtained by the same evaluations as in Example 22 are shown in Table 3.

Comparative Examples 14 and 15

Example 22 was repeated except that the ferromagnetic iron alloy powders obtained in Comparative Examples 4 and 7 were used. The results obtained by the same evaluations as in Example 22 are shown in Table 3.

|  | Magnetic powder used | Electroagnetic conversion properties | | | Storage stability |
| --- | --- | --- | --- | --- | --- |
|  |  | Ouput (Db) | N (db) | C/N (dB) | ΔBm (%) |
| Exmp. 22 | Exmp. 4 | 0.5 | −1.0 | 1.5 | 2 |
| Exmp. 23 | Exmp. 7 | −1.5 | −3.8 | 2.3 | 4 |
| Exmp. 24 | Exmp. 15 | 0.9 | −1.2 | 2.1 | 2 |
| Comp. 14 | Comp. 4 | 0.0 | 0.0 | 0.0 | 3 |
| Comp. 15 | Comp. 7 | −2.5 | −2.8 | 0.3 | 5 |

The following conclusions can be drawn from Table 3.

Comparing Examples 22 and 24 with Comparative Example 14, all of which used fine particles whose major axis length was about 60 nm, the tapes of Examples 22 and 24 are seen to have high output and low noise owing to their high Hc and low SFD. As a result, the improvement in C/N over Comparative Example 14 was +1.5 dB in Example 22 and +2.1 dB in Example 24.

Similarly, in the case of Example 23 and Comparative Example 15, which used fine particles whose major axis length was about 40 nm, the C/N of +2.3 dB in Example 23 was markedly better than the C/N of +0.3 dB in Comparative Example 15.

Owing to thorough formation of oxide coating at the particle surfaces, moreover, the magnetic tapes exhibited excellent storage stability.

Thus, the ferromagnetic iron alloy powders according the present invention make it possible to obtain magnetic recording media excellent in electromagnetic conversion properties and storage stability.

As explained in the foregoing, in accordance with this invention there can be obtained a ferromagnetic iron alloy powder that is excellent in oxidization resistance while also having high coercive force, despite being composed of ultra-fine particles of an average major axis length not greater than 80 nm. The present invention can therefore provide a ferromagnetic iron alloy powder suitable for next-generation high recording density media.

What is claimed is:

1. A ferromagnetic iron alloy powder for a magnetic recording medium composed of acicular iron-base particles of an average major axis length (X) of not less than 20 nm and not greater than 80 nm and having oxygen content of not less than 15 wt % and coercive force (Hc) of not less than $[0.0036 X^3 - 1.1 X^2 + 110 X - 1390$ (Oe)] (where X is average major axis length expressed in nm).

2. A ferromagnetic iron alloy powder according to claim 1, which contains an amount of Co such that Co/Fe expressed in atomic percentage is 10–50 at. %, has saturated magnetization (σs) of not greater than 130 emu/g, and has Δσs (percent change in σs during one-week storage at a constant temperature and relative humidity of 60° C. and 90%) of not greater than 15%.

3. A magnetic recording medium whose magnetic layers constituted or the ferromagnetic iron alloy powder of claim 1.

4. A magnetic recording medium whose magnetic layers constituted or the ferromagnetic iron alloy powder of claim 2.

* * * * *